(12) United States Patent
Dayton

(10) Patent No.: US 7,219,875 B2
(45) Date of Patent: May 22, 2007

(54) SOLENOID OPERATED VALVE WITH MAGNETIC FLUX DIRECTOR FOR REDUCING FRICTION

(75) Inventor: Robert A. Dayton, Attica, MI (US)

(73) Assignee: Eaton Corporation, Cleveland, OH (US)

( * ) Notice: Subject to any disclaimer, the term of this patent is extended or adjusted under 35 U.S.C. 154(b) by 99 days.

(21) Appl. No.: 11/029,313

(22) Filed: Jan. 5, 2005

(65) Prior Publication Data
US 2006/0145113 A1 Jul. 6, 2006

(51) Int. Cl.
*F16K 31/06* (2006.01)
(52) U.S. Cl. .................................. 251/129.15
(58) Field of Classification Search ............ 251/129.15
See application file for complete search history.

(56) References Cited

U.S. PATENT DOCUMENTS 6,029,703 A 2/2000 Erickson et al.
6,460,521 B1 10/2002 Modien
6,918,571 B1* 7/2005 Rose ..................... 251/129.18
7,051,993 B2* 5/2006 Kim et al. ............. 251/129.15

FOREIGN PATENT DOCUMENTS

JP 08 004 934 A 1/1996
JP 07 280 123 A 12/1996

OTHER PUBLICATIONS

EP Search Report, EP 05028553.5 search completed Mar. 30, 2006.

* cited by examiner

*Primary Examiner*—J. Casimer Jacyna
(74) *Attorney, Agent, or Firm*—Anna M. Shih; Roger A. Johnston

(57) ABSTRACT

A solenoid operated valve with the armature disposed within the coil axially between first and second flux collectors. A flux director surrounding the armature has annular portions thereof contracting one of the flux collectors and has a plurality of fingers spaced circumferentially about the annular portion and extending inwardly toward the armature to increase and distribute the flux thereto for minimizing magnetic side loading due to eccentricity.

12 Claims, 2 Drawing Sheets

SOLENOID OPERATED VALVE WITH MAGNETIC FLUX DIRECTOR FOR REDUCING FRICTION

BACKGROUND OF THE INVENTION

The present invention relates to solenoid operated valves and particularly valves of the type where an armature is disposed within the coil with an operating member for contacting and moving a valving element. Solenoid operated valves of the aforesaid type typically utilize an armature disposed within the coil forming an axial working air gap between the armature and the stationary pole piece or flux collector; however, an annular air gap is also formed about the armature by virtue of the arrangement of the armature within the coil.

Where a solenoid armature is disposed within the coil, any eccentricities or off center disposition of the armature will result in a reduced radial air gap on one side of the armature. This eccentricity inherently increases the magnetic flux across the narrowest part of the gap creating an imbalance and consequently increases the radial or side loading on the armature which can result in increased friction and resistance to axial armature movement in response to coil energization.

Heretofore, efforts to control the eccentricity of the annular air gap about a solenoid armature disposed within a coil have required tight control of tolerances on the manufacturing of the armature and the flux collector and a loss of the sliding bearing surfaces for positioning the armature within the coil, which has significantly increased the cost of manufacturing of the solenoid valve. Accordingly, it has been desired to provide a way or means of reducing the eccentricity of the annular air gap about an armature within the coil of a solenoid operated valve and to do so in a manner that is simple and relatively low in manufacturing cost thereby making the value suitable for high volume production of applications such as those employed for control functions in automotive applications.

BRIEF SUMMARY OF THE INVENTION

The present invention provides a solution to the above described problem minimizing the eccentricity and side loading of an armature disposed within the coil of a solenoid operated valve. The solenoid valve of the present invention employs a flux director contacting one of the pole pieces about the armature with fingers extending inwardly to provide magnetically permeable surfaces closely adjacent or lightly contacting the surface of the armature to provide the increased flux at the tips of the fingers which are uniformly distributed about the periphery of the armature to thereby balance the magnetic side loading on the armature.

DETAILED DESCRIPTION

Figure 1:
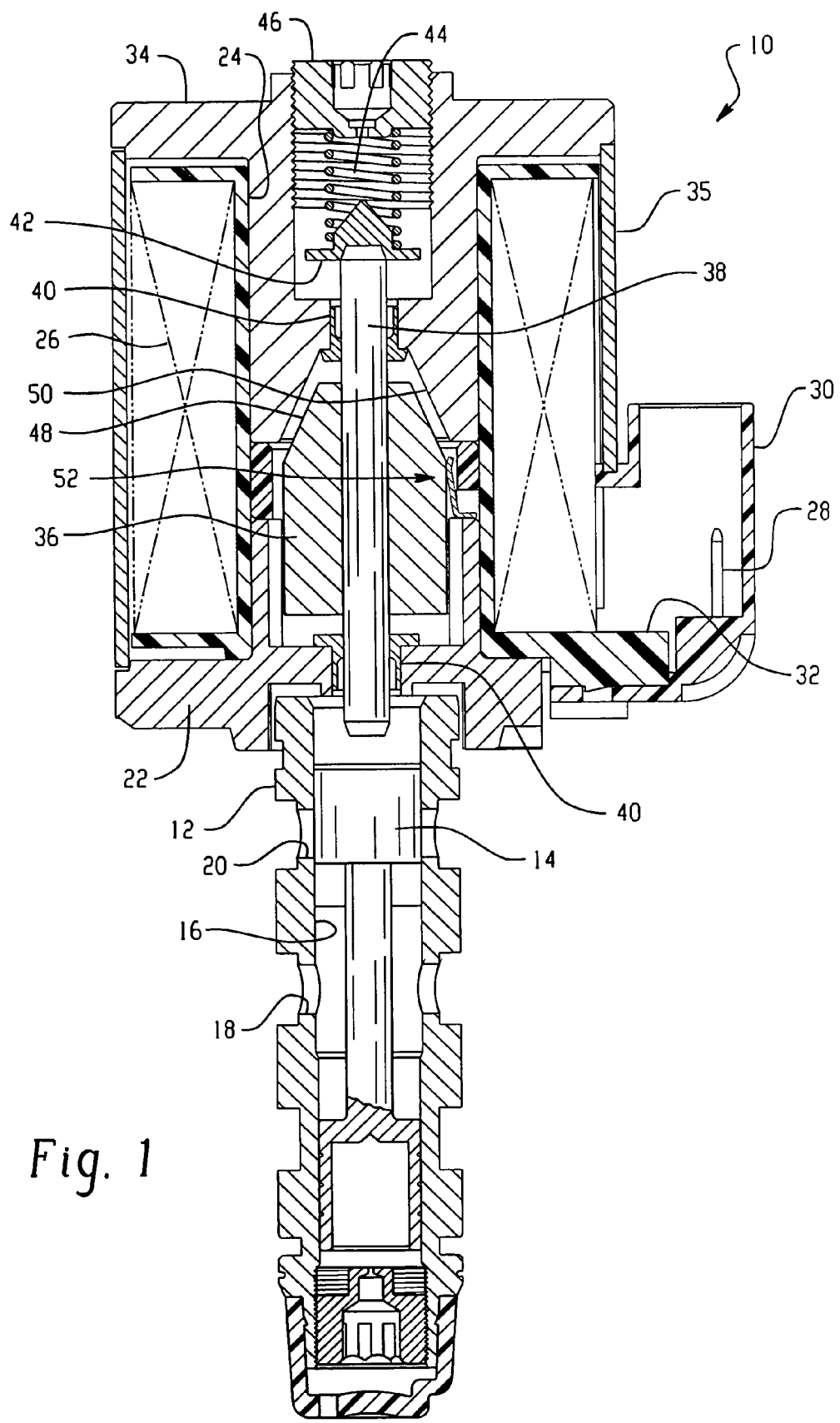
FIG. 1 is a sectional view taken the longitudinal centerline of an exemplary embodiment of the invention.

Referring to FIG. 1, a exemplary embodiment solenoid operated valve assembly employing the present invention is indicated generally at 10 and includes a valve body 12 with a moveable valve member such as, for example, spool 14 disposed in a valving bore 16 for valving flow between an inlet port 18 and an outlet 20 port. The valve body 12 is attached to a first or lower flux collector 22 which has mounted thereon coil bobbin 24 with a coil 26 wound thereon. The bobbin 24 has the ends of the coil 26 connected to electrical terminals such as terminal 28 which extends into an electrical receptacle or shell 30 attached to one end flange 32 on the bobbin.

A second or upper flux collector 34 is disposed on the end of coil 26 opposite flux collector 22 and has a portion thereof extending within the coil and forms an axial working air gap with an armature 36 disposed within the coil is surrounded by a casing or shell 35 which interconnects flux collectors 22 and 34.

An operating rod 38 is attached armature 36 and is journaled at its upper end within a bearing 40 disposed and the upper flux collector 34. The lower end of the operating rod extends downwardly and is journaled in a second bearing 40 disposed in the first flux collector 22. The lower end of the operating rod contacts the upper end of the valve member 14 for effecting movement thereof upon engergization of coil 26.

The upper end of the operating rod 38 may have a spring retainer 42 provided thereon which has registered there against the lower end of a spring 44 which has its upper end retained by an adjustment member 46 threadedly received in the flux collector 34 and is rotatable therein for adjusting the preload on spring 44 for calibrating the valve in a manner well known in the art.

The upper end of the armature 36 has a tapered portion 48 provided thereon which cooperates with a correspondingly tapered recess 50 formed in the lower end of flux collector 34 forming therebetween a working air gap for, upon electrical energization of the coil, effecting axial movement of the armature and operating rod 38 to effect movement of the valving member 14.

Referring to FIGS. 1 through 4, a flux director end spacer sub assembly is indicated generally at 52 and includes annular mounting ring or spacer 54 with cutouts 56 formed circumferentially there about and generally equally spaced arrangement.

Figure 3:
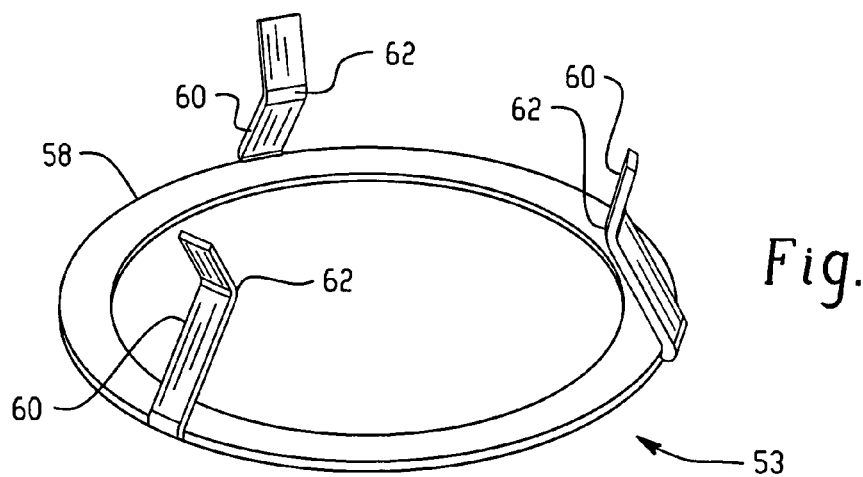
FIG. 3 is an axonometric view from above of the flux director of FIG. 2.

A flux director indicated generally at 53 generally ring shaped or annular portion 58 formed of magnetically permeable material has disposed thereabout, in generally circumferentially equally spaced arrangement a plurality of inwardly extending fingers or wipers 60 which may have a fold or bend 62 formed thereon to provide a discrete surface for positioning about the periphery of the armature 36. The flux director 53 may be formed from a flat blank from sheet stock of magnetically permeable material, and is shown in FIG. 3 in the formed conditions. The flux director 53 may be formed of spring tempered material.

Figure 2:
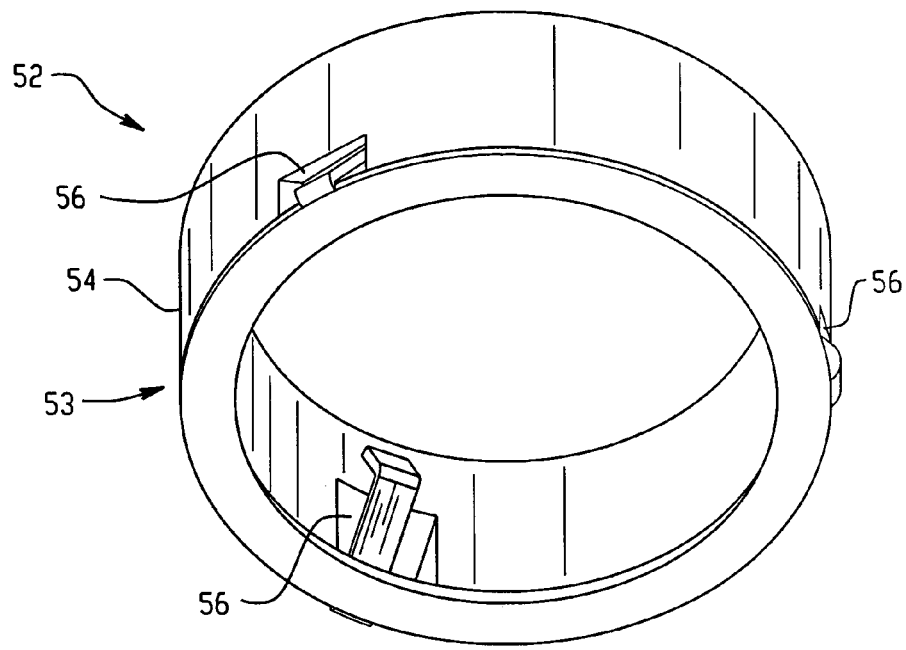
FIG. 2 is an axonometric view from below of the flux director and spacer sub assembly of the embodiment of FIG. 1.
Figure 4:
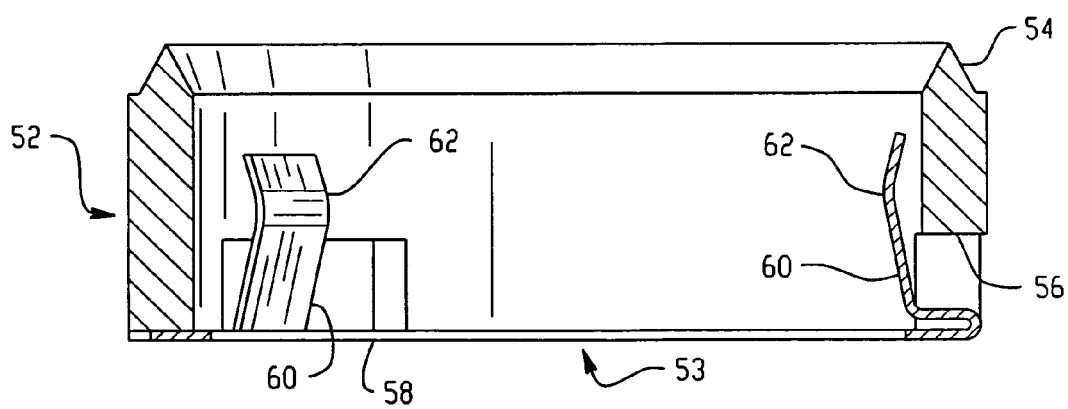
FIG. 4 is a cross sectional view of the sub assembly of FIG. 2.

Referring to FIGS. 2 and 4, the flux director 53 is shown assembled onto a spacer 54 which may be formed of plastic material, by deforming the fingers 60 and allowing the ends thereof to extend through the cutouts 56 to the interior of the spacer. The subassembly 52 of the annular flux director member 53 and spacer 54 maybe installed as a unit into the valve and configured to closely interfit the inner periphery of the bobbin 24 with the lower surface of member 58 contacting the upper end of the first flux collector 22 for providing a direct path of flux communication between the two members. The folds or bends 62 of the fingers 60 are positioned closely adjacent or lightly contacting the periphery of the armature to thereby provide equalized flux concentration about the periphery of the armature to thereby reduce the magnetic side loading thereon. This arrangement of the subassembly 52 allows it to be installed between the flux collectors of an existing solenoid operated valve construction without redesigning or retooling the parts thereof. The bends of folds 62 and the finger 60 may be either closely spaced to the armature or in light wiping contact therewith.

The present invention thus provides a simple relatively low cost and easy to assemble technique for reducing the magnetic side loading on the armature of the solenoid operated valve due to eccentricities of the armature with the coil and flux collectors and provides a subassembly of a flux director which may be assembled into an existing valve design without any significant modification thereof.

Although the invention has hereinabove been described with respect to the illustrated embodiments, it will be understood that the invention is capable of modification and variation and is limited only by the following claims.

What is claimed is:

1. A solenoid operated valve assembly comprising:
   (a) a coil including first and second spaced flux collectors defining a flux loop about the coil;
   (b) a valve body attached to one of said flux first and second flux collectors having an inlet and an outlet with a valve member movable therein for controlling flow between the inlet and outlet;
   (c) an armature guided for sliding movement within the coil and defining a working air gap with one of said first and second flux collectors;
   (d) a flux director disposed about said armature and contacting one of said first and second flux collectors, with portions thereof extending inwardly thereof toward said armature to reduce the radial air gap between said armature and said flux collectors, said portions of said flux director including a plurality of inwardly extending fingers; and,
   (e) structure associated with the armature operatively contacting the valve member for effecting movement thereof.

2. The valve assembly defined in claim 1, wherein said fingers have the ends thereof spaced closely adjacent the surface of said armature.

3. The valve defined in claim 2, wherein said flux director includes an annular portion with said fingers formed integrally therewith.

4. The valve member defined in claim 3, wherein said flux director is formed from flat sheet stock.

5. The valve defined in claim 1, wherein said first and second flux collectors have an annular configuration.

6. The valve member defined in claim 1, wherein said plurality of inwardly extending fingers are in wiping contact with said armature and are integrally formed on an annular portion of said flux director.

7. The valve assembly defined in claim 1, wherein said flux director includes an annular non-magnetic spacer with an annular magnetic member mounted thereon having an annular portion with a plurality of integrally formed inwardly extending fingers for minimizing the radial air gap between the armature and the first and second flux collectors.

8. A method of making a solenoid operated valve assembly comprising:
   (a) providing a coil with first and second flux collectors deforming a flux loop therewith;
   (b) providing a valve body with an inlet and outlet and a valve member moveable therein for controlling flow between the inlet and outlet and attaching the body to one of said first and second flux collectors;
   (c) disposing an armature within said coil for sliding movement therein and forming a working air gap with one of said flux collectors;
   (d) disposing a flux director in contact with one of said first and second flux collectors and forming a plurality of inwardly extending fingers thereof extending inwardly to minimize the air gap about said armature; and,
   (e) contacting said valve member with said armature for effecting the movement of the valve member.

9. The method defined in claim 8, wherein the step of disposing a flux director includes forming a one piece member with an annular portion having said plurality of inwardly extending fingers.

10. The method defined in claim 9, wherein said step of forming a one piece member includes forming from flat sheet stock.

11. The method defined in claim 8, wherein said step of disposing a flux director includes forming a non-magnetic annular spacer and forming a magnetic annular member with said plurality of inwardly extending fingers and mounting said member on said spacer.

12. The method defined in claim 8, wherein said step of disposing a flux director includes arranging said plurality of inwardly extending fingers in wiping contact with said armature.

* * * * *